(12) United States Patent
Kotecha et al.

(10) Patent No.: US 8,023,457 B2
(45) Date of Patent: Sep. 20, 2011

(54) FEEDBACK REDUCTION FOR MIMO PRECODED SYSTEM BY EXPLOITING CHANNEL CORRELATION

(75) Inventors: Jayesh H. Kotecha, Austin, TX (US); Kaibin Huang, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1190 days.

(21) Appl. No.: 11/537,948

(22) Filed: Oct. 2, 2006

(65) Prior Publication Data

US 2008/0080459 A1    Apr. 3, 2008

(51) Int. Cl.
    *H04W 4/00*    (2009.01)
(52) U.S. Cl. .................. 370/329; 370/269; 370/299
(58) Field of Classification Search .............. 370/329; 375/260, 267, 299
    See application file for complete search history.

(56) References Cited

U.S. PATENT DOCUMENTS

| | | | |
|---|---|---|---|
| 2005/0043031 A1* | 2/2005 | Cho et al. | 455/450 |
| 2005/0129137 A1* | 6/2005 | Yamada et al. | 375/267 |
| 2005/0201296 A1* | 9/2005 | Vannithamby et al. | 370/241 |
| 2006/0092054 A1* | 5/2006 | Li et al. | 341/67 |

OTHER PUBLICATIONS

Na Wei et al; Tackling MIMO-OFDMA Feedback Load Through Feedback Encoding; Jul. 2006; IEEE Xplore; Jul. 2006.*
Na Wei et al, Tackling MIMO-OFDMA Feedback Load Through Feedback Encoding, Sep. 6-8, 2009, IEEE Xplore, pp. 363-367.*
B. Banister et al., "A Simple Gradient Sign Algorithm for Transmit Antenna Weight Adaptation with Feedback," IEEE Transactions on Signal Processing, vol. 51, No. 5, May 2003.
K. Huang et al., "Effect of Feedback Delay on Limited Feedback for Temporally Correlated Channels," Jul. 2006.
K. Huang et al., "Joint Beamforming and Scheduling for SDMA Systems with Limited Feedback," Jun. 2006.
K. Huang et al., "Limited Feedback for Temporally-Correlated Channels_Feedback Rate and Delay," Mar. or Jun. 2006.
K. Huang et al., "Markov models for multi-antenna limited feedback systems," ICASSP, Jun. 2006.
K. Huang et al., "Multi-Antenna Limited Feedback for Temporally-Correlated Channels Feedback Compression," Jul. 2006.
K. Huang et al., "Orthogonal Beamforming in SDMA Downlink with Limited Feedback," Jul. 2006.
J.C. Roh et al., "An Efficient Feedback Method for MIMO Systems with Slowly Time-Varying Channels," IEEE Communications Society, WCNC 2004.

* cited by examiner

*Primary Examiner* — Charles Appiah
*Assistant Examiner* — Stamford Hwang
(74) *Attorney, Agent, or Firm* — Hamilton & Terrile, LLP; Michael Rocco Cannatti

(57) ABSTRACT

In a closed-loop wireless communication system, a codebook-based precoding feedback compression mechanism is provided to remove redundancy from the precoding feedback that is caused by channel correlation in time and frequency. Redundancy due to temporal correlation of the transmission channel is removed by sending precoding feedback only if there is a change in the precoder state for the channel to the receiver. Redundancy due to frequency correlation is removed by run length encoding the precoding feedback, thereby compressing the precoding feedback prior in the frequency domain. By compressing the precoding feedback, the average rate of precoder feedback is reduced.

19 Claims, 7 Drawing Sheets

FEEDBACK REDUCTION FOR MIMO PRECODED SYSTEM BY EXPLOITING CHANNEL CORRELATION

BACKGROUND OF THE INVENTION

1. Field of the Invention

The present invention is directed in general to field of information processing. In one aspect, the present invention relates to a system and method for reducing precoding feedback in MIMO communication systems.

2. Description of the Related Art

Wireless communication systems transmit and receive signals within a designated electromagnetic frequency spectrum, but the capacity of the electromagnetic frequency spectrum is limited. As the demand for wireless communication systems continues to expand, there are increasing challenges to improve spectrum usage efficiency. To improve the communication capacity of the systems while reducing the sensitivity of the systems to noise and interference and limiting the power of the transmissions, a number of wireless communication techniques have been proposed, such as Multiple Input Multiple Output (MIMO), which is a transmission method involving multiple transmit antennas and multiple receive antennas. For example, space division multiple access (SDMA) systems can be implemented as closed-loop systems to improve spectrum usage efficiency. SDMA has recently emerged as a popular technique for the next generation communication systems. SDMA based methods have been adopted in several current emerging standards such as IEEE 802.16 and the 3rd Generation Partnership Project (3GPP) Long Term Evolution (LTE) platform.

FIG. 1 depicts a MIMO wireless communication system 100 in which a transmitter 102 having a first antenna array 106 communicates with receiver 104 having a second antenna array 108, where each antenna array includes one or more antennas. The communication system 100 may be any type of wireless communication system, including but not limited to a MIMO system, SDMA system, CDMA system, OFDMA system, OFDM system, etc. In the communication system 100, the transmitter 102 may act as a base station, while the receiver 104 acts as a subscriber station, which can be virtually any type of wireless one-way or two-way communication device such as a cellular telephone, wireless equipped computer system, and wireless personal digital assistant. Of course, the receiver/subscriber station 104 can also transmits signals which are received by the transmitter/base station 102. The signals communicated between transmitter 102 and receiver 104 can include voice, data, electronic mail, video, and other data, voice, and video signals. In operation, the transmitter 102 transmits a signal data stream (e.g., signal s1) through one or more antennas 106 and over a channel $H_1$ to a receiver 104, which combines the received signal from one or more receive antennas 108 to reconstruct the transmitted data. To transmit the signal vector $s_1$, the transmitter 102 prepares a transmission signal, represented by the vector $x_1$, for the signal $s_1$. (Note: lower case bold variables indicate vectors and upper case BOLD variables indicate matrices). The transmission signal vector $x_1$ is transmitted via a channel represented by a channel matrix $H_1$, and is received at the receiver 104 as a receive signal vector $y_1 = H_1 x_1 + n_1$ (where n represents co-channel interference or noise). The channel matrix $H_1$ represents a channel gain between the transmitter antenna array 106 and the subscriber station antenna array 108. Thus, the channel matrix $H_1$ can be represented by an k×N matrix of complex coefficients, where N is the number of antennas in the transmitter/base station antenna array 106 and k is the number of antennas in the receiver/subscriber station antenna array 108. The value of k can be unique for each receiver/subscriber station. As will be appreciated, the channel matrix $H_1$ can instead be represented by a N×k matrix of complex coefficients, in which case the matrix manipulation algorithms are adjusted accordingly so that, for example, the right singular vector calculation on a k×N channel matrix becomes a left singular vector calculation on a N×k channel matrix. The coefficients of the channel matrix $H_1$ depend, at least in part, on the transmission characteristics of the medium, such as air, through which a signal is transmitted. A variety of methods may be used at the receiver to determine the channel matrix $H_1$ coefficients, such as transmitting a known pilot signal to a receiver so that the receiver, knowing the pilot signal, can estimate the coefficients of the channel matrix $H_1$ using well-known pilot estimation techniques. Alternatively, when the channel between the transmitter and receiver are reciprocal in both directions, the actual channel matrix $H_1$ is known to the receiver and may also be known to the transmitter.

While the benefits of MIMO are realizable when the receiver 104 alone knows the communication channel, these benefits are further enhanced in "closed-loop" MIMO systems when the transmitter 102 has some level of knowledge concerning the channel response between each transmit antenna element and each receive antenna element. Precoding systems provide an example application of closed-loop systems which exploit channel-side information at the transmitter ("CSIT"). With precoding systems, CSIT can be used with a variety of communication techniques to operate on the transmit signal before transmitting from the transmit antenna array 106. Examples of precoding techniques including providing a multi-mode beamformer function to optimally match the input signal on one side to the channel on the other side, applying weighting and combining values to the beams, and selectively allocating power to one or more of the beams, based on the transmission channel conditions.

To apply MIMO precoding at the transmitter 102, full broadband channel knowledge at the transmitter 102 may be obtained by using uplink sounding techniques (e.g., with Time Division Duplexing (TDD) systems). Alternatively, channel feedback techniques can be used with MIMO systems (e.g., with TDD or Frequency Division Duplexing (FDD) systems) to feed back channel information to the transmitter 102. One way of implementing precoding over a low rate feedback channel is to use codebook-based precoding to reduce the amount of feedback as compared to full channel feedback. However, such precoding feedback can easily use up the usually small bandwidth allocated to the feedback control channel due to the multiplicity of the precoder coefficients and/or receiver stations in the system 100. As a result, the limited feedback resources of conventional codebook-based systems can be overwhelmed by unacceptably high feedback data rates.

Accordingly, an efficient feedback methodology is needed to provide precoding feedback to the transmitter using a codebook to reduce the size of the feedback signal while sustaining a minimal loss in link performance. There is also a need for an improved feedback system which avoids degrading uplink performance and reduces long feedback delay. In addition, there is a need for a system and methodology for reducing the average precoder feedback rate to reduce uplink performance loss and feedback delay. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

Figure 1:
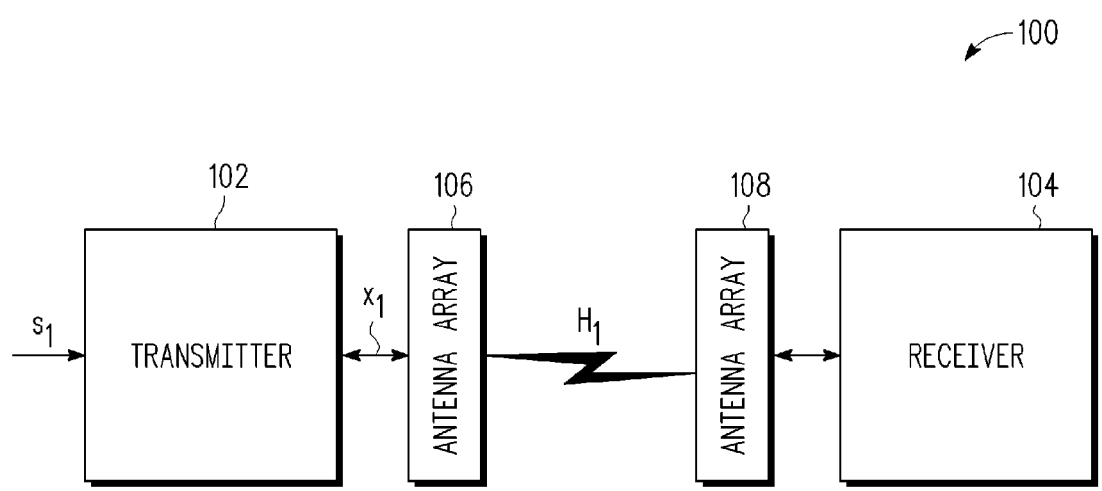
FIG. 1 (labeled prior art) depicts a wireless communication system.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

A system and methodology are described for exploiting channel correlation in time and/or frequency to reduce precoder feedback in wireless multi-input, multiple output (MIMO) systems. By compressing precoder feedback at the receiver to reduce redundancy in precoder feedback information that results from the channel correlation, the average feedback rate may be reduced. In various embodiments, redundancy in time may be removed from the precoder feedback by monitoring variations of the precoder state in time at the receiver so that precoder state information for a given time interval is communicated to the transmitter only if it differs from the precoder state information for the previous time interval. Otherwise, no feedback is performed. Compression of the precoder feedback information in time exploits the temporal correlation of the transmission channel whereby, statistically, the characteristics of the transmission channel change slowly over time in most cases of interest. This compression technique may also be applied to broadband communication systems by dividing a broadband channel into a plurality of clusters (where each cluster consists of one or more sub-carriers in a given frequency range) and then sending back temporally compressed precoder state information only for those clusters where there is a change in precoder state. Additional compression may be obtained by limiting the number clusters for which temporally compressed precoder state information is fed back, such as by ranking the candidate clusters and sending back the temporally compressed precoder station information only for a predetermined number of the top-ranked clusters, where the predetermined number may be fixed or may vary by feedback interval. In other embodiments, frequency domain redundancy in the sub-carriers of orthogonal frequency-division multiplexing (OFDM) symbols may be removed from the precoder feedback by compressing the precoder states over frequency using run-length coding. Specifically, where the precoder state sequence for the sub-carriers of an OFDM symbol is parsed into runs of identical numbers, each run may be encoded in two numbers, one specifying the precoder state and the other specifying the run length. The compressed precoder feedback information is then communicated to the transmitter through the feedback control channel where it is decoded into the original precoder state sequence and used to restore precoders for different sub-carriers. Compression of the precoding feedback indices for the sub-carriers in an OFDM symbol exploits the transmission channel frequency correlation for the OFDM symbol sub-carriers.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

Figure 2:
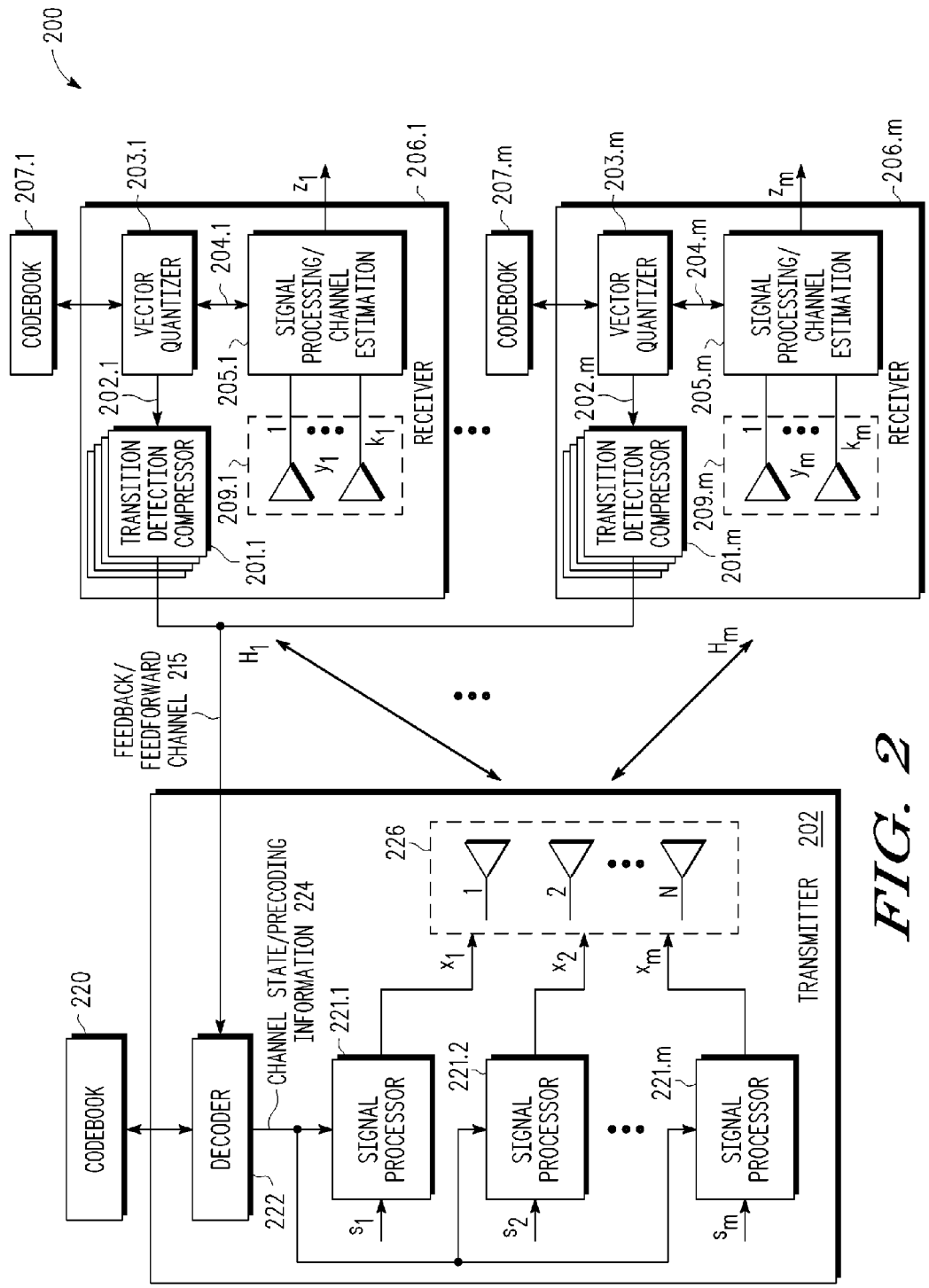
FIG. 2 depicts a wireless communication system in which a codebook-based precoder index is compressed in time at a receiver prior to feed back to a transmitter.

FIG. 2 depicts a wireless communication system 200 in which a transmitter 202 uses codebook feedback techniques to precode one or more input signals that are transmitted from a transmitter 202 (e.g., a base station) to one or more receivers 206.1-206.m (e.g., subscriber stations), where the precoder index is compressed in time at a receiver 206.i prior to feed back to a transmitter 202. The transmitter 202 includes an array 226 of one or more antennas for communicating with the receivers 206.1 through 206.m, each of which includes an array 209.i having one or more antennas for communicating with the transmitter 202. In operation, a data signal si presented at the transmitter 202 for transmission to the receiver 206.i is transformed by the signal processor 221.i into a transmission signal represented by the vector $x_i$. The signals transmitted from the transmit antenna 226 propagate through a matrix channel $H_i$ and are received by the receive antennas 200.i where they are represented by the vector $y_i$. For a MIMO channel from the transmitter 202 to the $i^{th}$ receiver 206.i, the channel is denoted by $H_i$, $i \in \{1, 2, \ldots, m\}$. The channel matrix $H_i$ may be represented as an $k_i \times N$ matrix of complex entries representing the complex coefficients of the transmission channel between each transmit-receive antenna pair, where N represents the number of transmitter 202 antennas, and $k_i$ represents the number of antennas of the $i^{th}$ receiver 206.$i$. At the receiver 206.$i$, the signal processing unit 205.$i$ processes the $y_i$ signals received on the k antennas to obtain a data signal, $z_i$, which is an estimate of the transmitted data $s_i$. The processing of the received $y_i$ signals may include combining the $y_i$ signals with appropriate combining vector information retrieved from the codebook 207.$i$.

Precoding for downlink transmissions (transmitter to receiver) may be implemented by having each receiver 206.$i$ determine its MIMO channel matrix $H_i$—which specifies the transmission channel between a transmitter and an $i^{th}$ receiver—in the channel estimation signal processing unit 205.$i$. For example, in a MIMO implementation, each receiver 206.1-$m$ determines its MIMO channel matrix $H_i$ by using pilot estimation or sounding techniques to determine or estimate the coefficients of the channel matrix $H_i$. Each receiver 206.$i$ uses the estimated MIMO channel matrix or other channel-related information (which can be channel coefficients or channel statistics or their functions, such as a precoder, a beamforming vector or a modulation order) to generate precoding information that is to be used to precode the signals transmitted by the transmitter. This may be done by using the channel-related information to access precoding information stored in the receiver codebook 207.$i$.

Rather than feeding back the entire vector or matrix representation of the transmission profile or related precoding information (which would require a large number of bits), the receiver 206.$i$ uses a codebook quantizer 203.$i$ to compress or quantize the transmission profile (e.g., precoding information) that is generated from the detected channel information and that will be used by the transmitter in controlling signal transmission to the receiver. The quantizer 203.$i$ generates a codebook index by accessing the receiver codebook 207.$i$ which stores an indexed set of possible transmission profiles and/or channel matrices $H_i$ along with associated precoding information so that the estimated channel matrix information 204.$i$ generated by the signal processing unit 205.$i$ can be used by the codebook quantizer 203.$i$ to retrieve a codebook index from the limited feedback codebook 207.$i$. The retrieved codebook index 202.$i$ is provided to a transition detection compressor 201.$i$, which detects the changes on the precoder state. Alternatively, the precoding information generated by the signal processor 205.$i$ and/or retrieved from the codebook 207.$i$ may be provided directly to the transition detection compressor 201.$i$ without being quantized, since both the precoding information and the precoding index can be used to detect changes in the precoder state. If the transition detection compressor 201.$i$ detects a change in the precoder state, the new precoder state is communicated (either as a precoding index or as the precoding information) over an uplink channel (e.g., a low rate feedback channel 215) to the transmitter 202.

Based on the feedback of the precoding index, the decoder 222 at the transmitter 202 retrieves from the codebook 220 a matching transmission channel profile or related precoding information 224 for a particular receiver 206.$i$ which is used to precode the transmission signal $s_i$. In this way, precoding information is fed back to a transmitter 202 only when there are changes in the precoder state. While the present description is directed primarily to the example of reducing the precoding feedback required for precoding of signal transmissions from a transmitter, it will be appreciated that the same sequence can be applied in reverse when the channels are not reciprocal in both directions (for example, in the case of an FDD system), in which case each transmitter station can generate and feedback to the receiver (only when there are changes) a precoder index which represents (in quantized form) the precoding information generated at the transmitter for use in controlling the transmission of signals from the receiver to the transmitter. In addition, where the receiver 206.$i$ includes a precoder codebook and the transmitter 202 is able to directly estimate the channel information for the channel between the transmitter 202 and receiver 206.$i$ (for example, in the case of a TDD system), the transmitter 202 can itself determine the transmission profile to be applied to the input data signals transmitted by the transmitter 202. By having the transmitter quantize the transmission profile into a precoder index which is then fed forward to the receiver 206.$i$ only when there are changes, the receiver can use the precoder index to retrieve the corresponding transmission profile from the receiver codebook for purposes of processing the signal received at the receiver 206.$i$.

Figure 3:
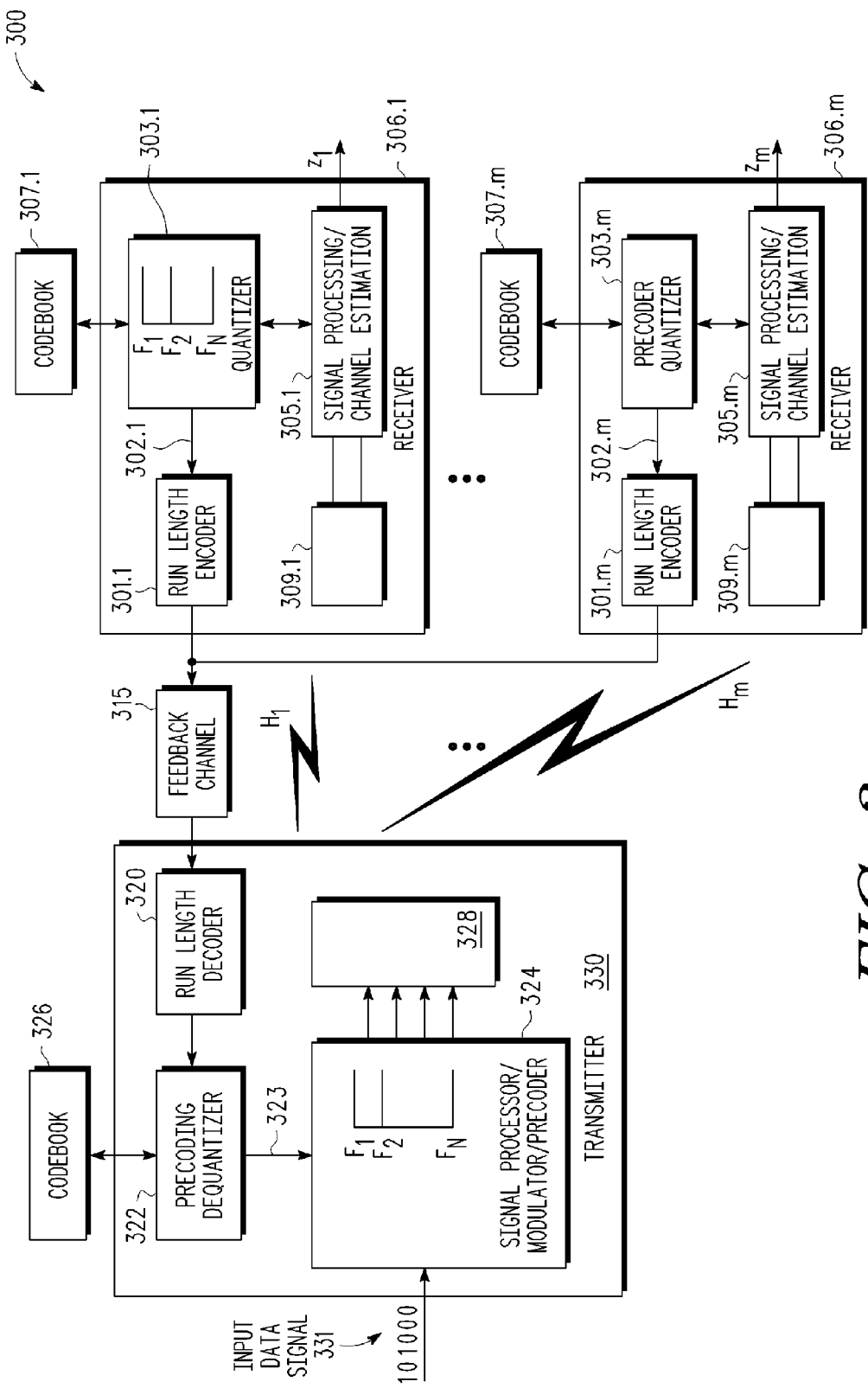
FIG. 3 depicts a wireless communication system in which a codebook-based precoder index is compressed over frequency using run-length coding at a receiver prior to feed back to a transmitter.

FIG. 3 depicts a wireless communication MIMO system 300 in which a transmitter station 330 communicates with m receiver stations 306.1 through 306.$m$ using a frequency modulation technique, such as OFDM, to convey symbols with a plurality of sub-carriers, where the precoder indices for the sub-carriers or clusters of sub-carriers (where there is one precoder index for each cluster of subcarriers) are compressed over frequency using run-length coding at a receiver 306.$i$ prior to feed back to a transmitter 330. As depicted, the transmitter station 330 includes an array 328 of multiple antennas for communicating with the receiver stations 306.1 through 306.$m$, and each receiver station 306.$i$ includes respective antenna arrays 309.$i$ for communicating with the transmitter station 330. In accordance with various illustrative embodiments of the wireless communication system 300, each receiver station 306.$i$ quantizes the precoding information for each symbol subcarrier or clusters of sub-carriers that will be used by the transmitter in controlling signal transmission to the receiver. For example, a precoder quantizer 303.$i$ may be used to extract a precoding index 302.$i$ from the codebook 307.$i$ for each OFDM symbol sub-carrier on the basis of the estimated channel information produced by the signal processor 305.$i$.

Rather than feeding back the entirety of every precoding index 302.$i$ for each and every symbol sub-carrier $F_1, F_2, \ldots F_N$, the receiver 306.$i$ uses a run length encoder 301.$i$ to compress the quantized precoding information 302.$i$ (e.g., the precoding indices) for the symbol sub-carriers. The run length encoding exploits the fact that the precoder state information for the symbol sub-carrier frequencies $F_1, F_2, \ldots F_N$ is represented as a sequence of numbers 302.$i$ which often contains multiple runs of identical numbers due to correlation in the frequency domain. The run length encoder 301.$i$ acts to compress the precoding indices 302.$i$ by parsing the precoder state sequence into runs of identical numbers so that each run is encoded in two numbers, one specifying the precoder state and the other specifying the run length. For example, if the precoder indices 302.$i$ for sub-carriers on one OFDM symbol are computed at the receiver as the state sequence "2 2 2 2 3 3 3 3 5 5 5 5 5," the run length encoder 301.$i$ encodes this sequence as the run length encoded (RLE) sequence (2, 4), (3, 4), (5, 6). The encoded RLE sequence is then communicated to the transmitter 330 over the feedback channel 315. At the transmitter 330, a run length decoder 320 acts to decompress the RLE sequence into the original precoder state sequence for different sub-carriers. The dequantizer 322 uses the decompressed precoder state sequence to access the codebook 326 and provide precoding information 323 to the signal processor 324.

In accordance with the foregoing, the transmitter station 301 and/or receiver station 307.$i$ include a processor, software executed by the processor, and other hardware that allow the processes used for communication and any other functions performed by the transmitter station 301 and each of receiver stations 306.i.

Figure 4:
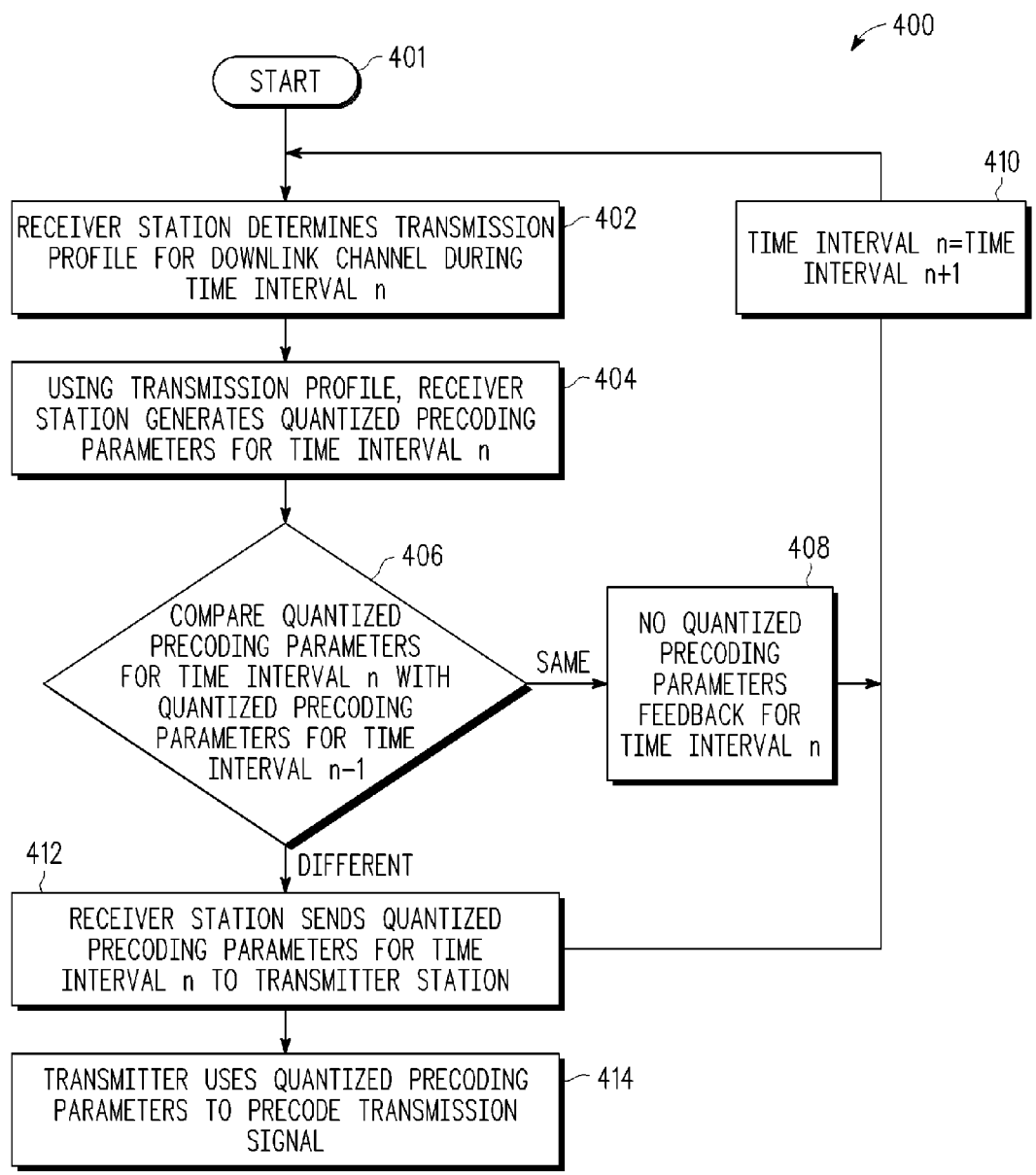
FIG. 4 depicts an example flow for a first feedback index compression methodology for generating and feeding back a precoder index that is compressed in time.

FIG. 4 depicts a generalized precoding methodology for generating and feeding back a precoder index that is compressed in time. The methodology starts (step 401) by determining the transmission profile for the MIMO channel or channel information to a given receiver station at a given time interval (e.g., interval n) by using estimated channel information (step 402). Generally, an estimate of the channel information can be determined by embedding a set of predetermined symbols, known as training symbols, at a transmitter station and processing the training symbols at a receiver station to produce a set of initial channel estimates. In this example, the MIMO transmission channel being estimated at the receiver station may be characterized as a channel matrix H. The singular value decomposition (SVD) of the MIMO channel matrix $H=U \Lambda V^H$, where the matrix U is a left eigen matrix representing the receive signal direction, the matrix $\Lambda$ represents the strength (or gain) of the channel and the matrix V is a right eigen matrix representing the transmit signal direction.

Using the transmission profile, the receiver station generates quantized precoding parameters for the given time interval (step 404), though as described herein, the precoding parameters need not necessarily be quantized since transitions in precoding information can be detected, whether quantized or not. For example, the channel eigenvectors from the estimated MIMO channel are used to choose the optimal precoding parameters for the channel. Alternatively, a precoding codeword can be chosen from the codebook by identifying which one optimizes a given performance metric, such as, for example, a spectral efficiency metric. By storing candidate precoding parameters as indexed entries in a codebook, quantization occurs by using the index corresponding to the chosen optimal precoding parameters to represent the chosen precoding parameters.

At this point in the process, the precoder state (whether represented as quantized precoding parameters or otherwise) for a predetermined time interval has been selected. This precoder state is compared to the previous precoder state (step 406), such as by using a state transition detector circuit or process. In accordance with various embodiments of the present invention, if no change in the precoder state is detected ("same" outcome from decision block 406), then no precoder state information is fed back to the transmitter (step 408) and the process advances to the next time interval (step 410). On the other hand, if the state transition detector detects a change in the precoder state ("different" outcome from decision block 406), then the receiver feeds back the precoder state to transmitter (step 412) which uses the quantized precoding parameters to apply precoding to the input data signal (step 414), and the process advances to the next time interval (step 410). In this way, the process repeats so that the precoder state (e.g., a precoding index) is fed back to the transmitter station "only" for each detected change in the precoder state.

Figure 5:
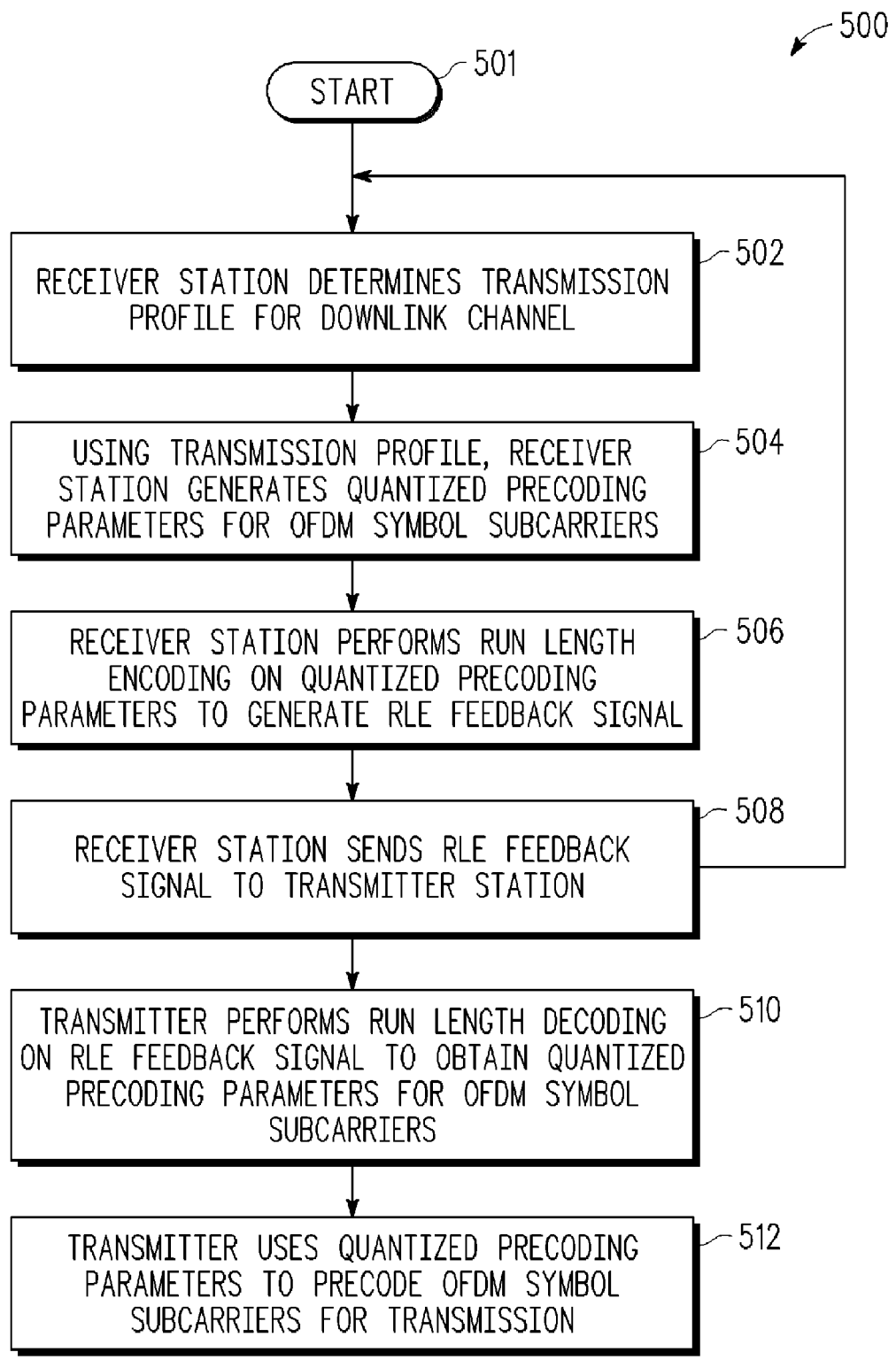
FIG. 5 depicts an example flow for a second feedback index compression methodology for generating and feeding back a precoder index that is compressed in frequency.

Selected embodiments of the present invention may also be illustrated with reference to FIG. 5, which depicts a codebook-based process flow 500 for feeding back precoder indices for OFDM symbol sub-carriers or cluster of sub-carriers that are run length encoded to remove redundancy from the frequency domain. As depicted, the process starts (step 501) when the receiver determines the transmission channel profile based on the estimated channel information for the MIMO transmission channel (step 502). Based on the channel profile information, the receiver selects precoding parameters for the sub-carriers of an OFDM symbol or for cluster of sub-carriers and then quantizes the precoding parameters (step 504) into a sequence of values, such as by accessing a codebook of indexed precoding parameters to obtain an index value for a selected precoding parameter. To exploit the redundancy of the quantized precoding parameters in the frequency domain, the quantized precoding parameters for the sub-carriers are compressed with a run length encoding process (step 506), thereby generating a run length encoded (RLE) or compressed quantized precoder parameter signal. Specifically, the sequence representing the quantized precoder state for the symbol sub-carriers is parsed into runs of identical numbers, and each run is encoded into two numbers, one specifying the precoder state and the other specifying the run length. The compressed quantized precoder parameters are then communicated as a RLE feedback signal over the feedback control channel to the transmitter (step 508) and the receiver repeats the foregoing sequence (as indicated by the feedback line to step 502). At the transmitter, the RLE feedback signal is decompressed with a run length decoding process (step 510) to generate precoding indices for the OFDM symbol sub-carriers. The indices are then used to access precoding parameters from the codebook at the transmitter to precode the symbol sub-carriers that are applied to the input data signal (step 512).

Figure 6:
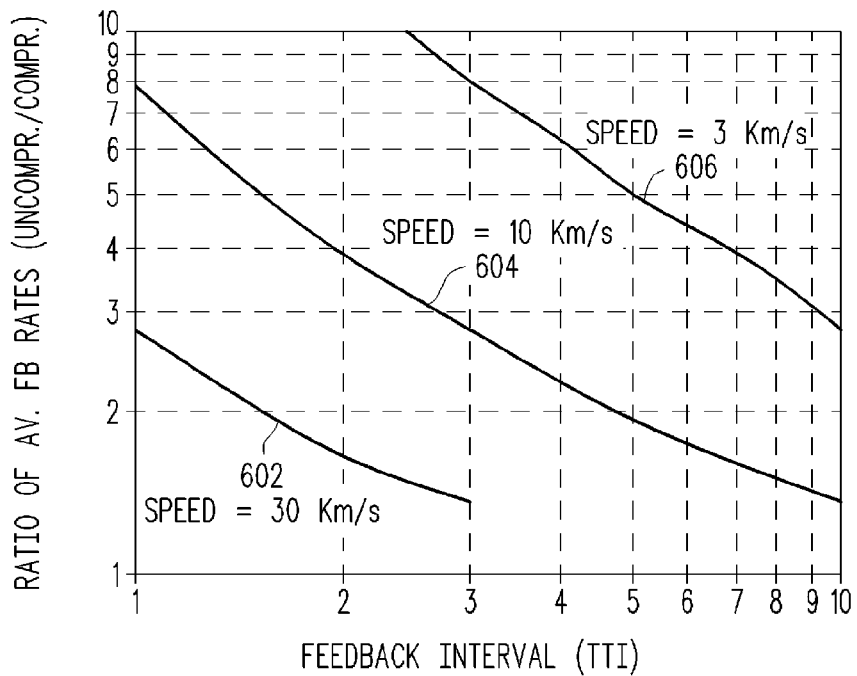
FIG. 6 depicts a simulated comparison of different feedback ratios for different receivers which compress the precoding feedback in time.

To demonstrate the effectiveness of compressing the quantized precoding feedback signal in time, FIG. 6 depicts a simulation of the ratio of uncompressed feedback rates to compressed feedback rates for different receivers which compress the precoding feedback in time. As depicted by the simulation of a 4×2 MIMO channel with independent identically distributed (i.i.d.) Rayleigh fading over a narrow band using a precoder codebook with 64 entries where the temporal correlation follows the Clark's function, feedback compression in time is most effective for channels having high temporal correlation, such as receivers that are moving slowly or receivers having small feedback intervals. For example, the curve 602 depicts the ratio of the uncompressed feedback rate to the time-compressed feedback rate for a receiver moving at 30 km/s, while the curve 604 depicts the ratio of average feedback rates for a receiver moving at 10 km/s and the curve 606 depicts the ratio of average feedback rates for a receiver moving at 3 km/s. As these curves demonstrate, feedback compression in time is very effective for receivers that are moving at lower speeds, but less effective for higher speeds (where there is less temporal correlation in the channel profile). As the simulation shows, feedback compression in time is more effective for smaller feedback intervals (where the higher sampling rate should result in a higher temporal correlation in the channel profile).

Figure 7:
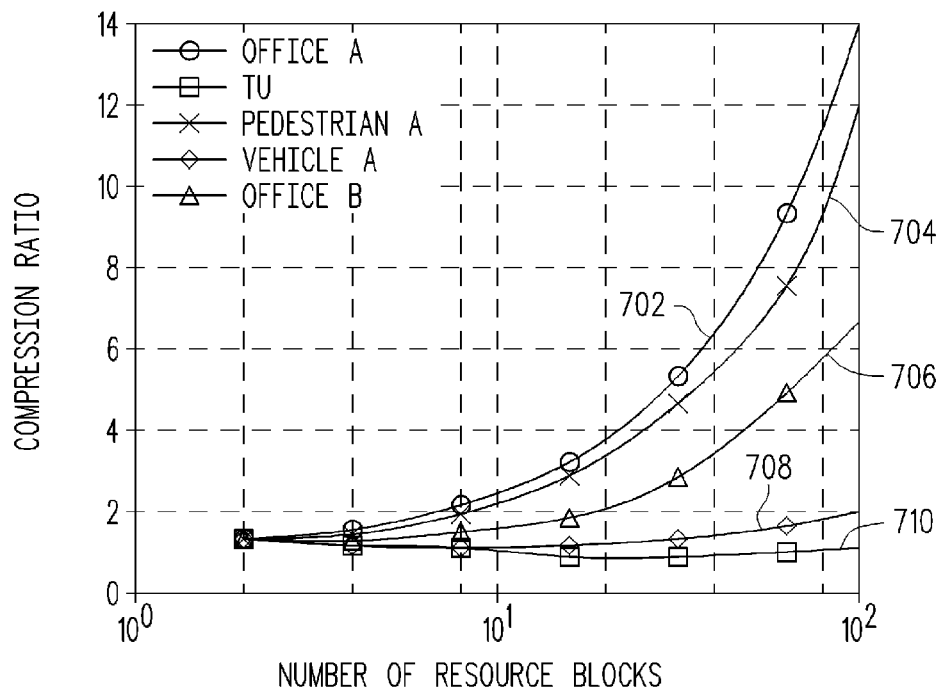
FIG. 7 depicts a simulated comparison of different compression ratios for different receivers which compress the precoding feedback in frequency.

As for the effectiveness of using run length coding to compress the precoding feedback, FIG. 7 depicts a simulated comparison of compression ratios for different receivers which compress the precoding feedback in frequency. In the depicted simulation of a 4×2 MIMO channel with i.i.d. Rayleigh fading over a broadband channel where 256 sub-carriers are encoded with a precoder codebook with 64 entries, feedback compression in frequency is most effective for channels that are not highly frequency selective since these channels have a high correlation in the frequency domain. For example, the curve 702 depicts the compression ratio for Office A (a receiver reached over a channel having the lowest frequency selectivity), while the curve 704 depicts the compression ratio for Pedestrian A (a receiver reached over a channel having relatively lower frequency selectivity) and the curve 706 depicts the compression ratio for Office B (a receiver reached over a channel having intermediate frequency selectivity). In addition, the curve 708 depicts the compression ratio for Vehicle A (a receiver reached over a channel having relatively higher frequency selectivity), while the curve 710 depicts the compression ratio for TU (a receiver reached over a channel having the highest frequency selectivity). As these curves demonstrate, compression in frequency significantly reduces the number of feedback bits per OFDM symbol for less frequency selective channels (such as "Office A" and "Pedestrian A") since these channels have high correlation in frequency domain. However, for highly frequency selective channels (such as "vehicular A" and "TU"), compression is less effective.

Figure 8:
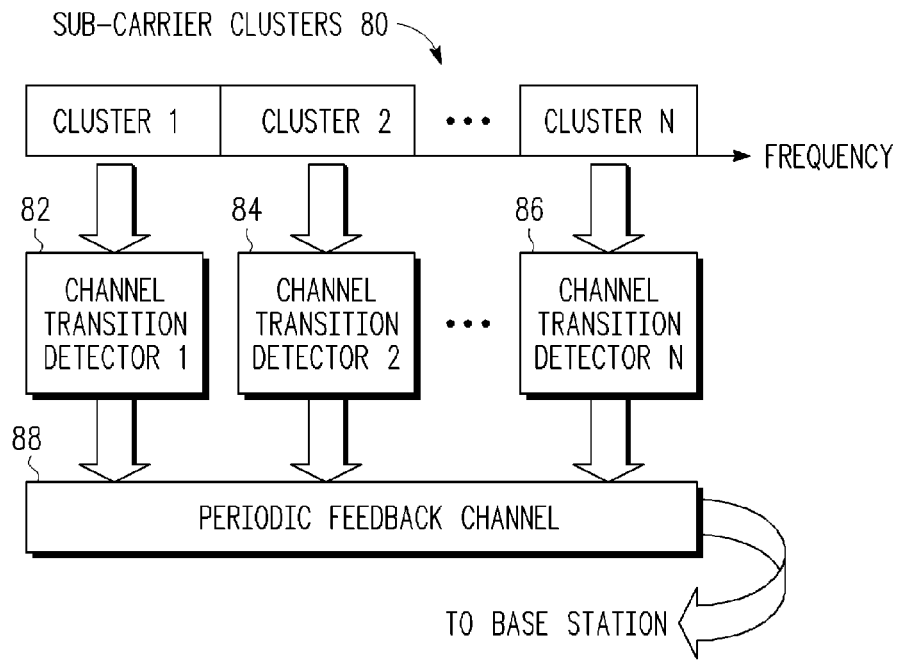
FIG. 8 depicts a generalized system flow for temporally compressing precoding feedback for broadband MIMO channels.

The precoding feedback compression techniques described above may be extended and applied to a variety of communication systems, including but not limited to TDD systems, FDD systems, OFDM systems and broadband systems. For example, FIG. 8 depicts a generalized system flow for temporally compressing precoding feedback for a broadband MIMO channel. To implement precoding for the broadband channel, the channel may be divided into a plurality of clusters, where each cluster consists of one or more sub-carriers in a given frequency range. In FIG. 8, the clusters are depicted as a sequence of contiguous and localized sub-carrier clusters 80 (Cluster 1, Cluster 1, . . . Cluster N), though there is no requirement that the clusters necessarily be either contiguous or localized. For example, a set of non-continuous sub-carriers can be mapped to each cluster. Likewise, though each cluster may contain a predetermined number of M sub-carriers, there is no requirement that each cluster have the same number of sub-carriers.

By breaking down the broadband channel into one or more constituent clusters, the precoding requirements for each cluster may be individualized to reflect the potentially differing channel conditions associated with each cluster. Thus, for each of the N sub-carrier clusters, a transmission profile is generated and quantized using the codebook-based techniques, such as described herein. The resulting N quantized transmission profiles may be temporally compressed at the receiver with a transition detection compressor, such as the transition detection compressor 201.$i$ depicted in FIG. 2 as being implemented with one or more compressor circuits. For example, a single processor or controller could be used to detect channel transitions for all the clusters or for a subset of the clusters. Alternatively and as illustrated in FIG. 8, N separate channel transition detection circuits could be used, so that a first channel transition detector 82 is used to detect changes in the precoder feedback from a first cluster (or group of clusters), a second channel transition detector 84 is used to detect changes in the precoder feedback from a second cluster (or group of clusters), and so on. By sending precoding index information over the feedback channel 88 to the transmitter or base station only for those clusters whose precoder has changed in time, the amount of feedback may be significantly reduced, thereby providing an efficient precoder feedback for the broadband MIMO channel.

Figure 9:
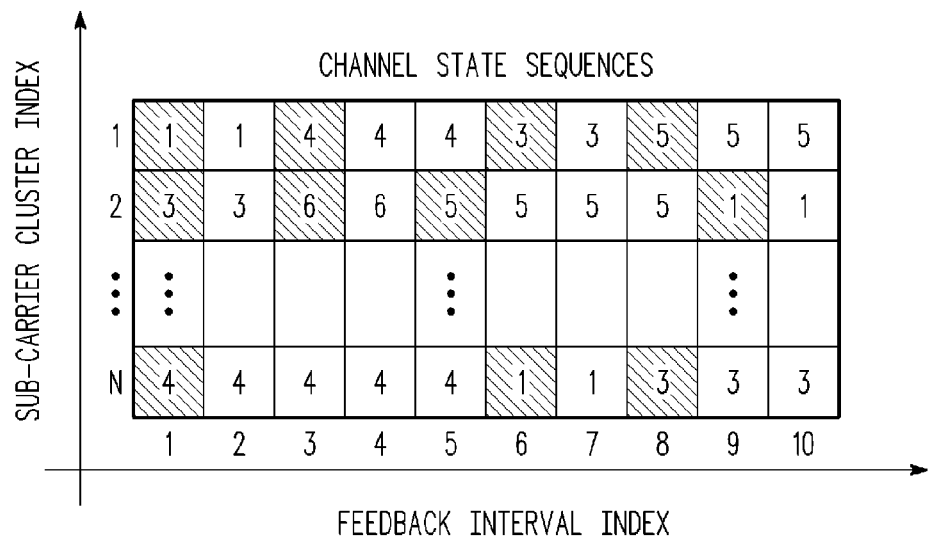
FIG. 9 depicts an example sequence of channel state sequences for a plurality of sub-carrier clusters in a broadband channel.

To illustrate how the precoding feedback for the clusters of a broadband channel may be temporally compressed, FIG. 9 depicts an example sequence of channel state sequences for a plurality of sub-carrier clusters in a broadband channel. As illustrated, the precoding indices for the N sub-carriers at a first feedback interval (Cluster 1=1, Cluster 2=3, . . . Cluster N=4) are the same at the second feedback interval, so no change or transition is detected. As a result, no precoding feedback is sent to the transmitter. The same is true for the fourth, seventh and tenth feedback intervals, since the precoding indices do not change at these intervals.

However, at the third feedback interval, there is a change in the indices for the first and second clusters (Cluster 1=4, Cluster 2=6, . . . Cluster N=4). For only the clusters where a precoding index transition is detected at the third feedback interval (e.g., Clusters 1 and 2), precoding feedback is sent to the transmitter that specifies both the value (e.g., precoding index=4) of the new precoding index and the corresponding cluster (e.g., Cluster 1) that changed. As will be appreciated, the specification of the corresponding cluster will require $\log_2(N)$ bits to indicate which cluster has changed. In similar fashion, any index transitions in the other feedback intervals (e.g., at the fifth, sixth, eighth and ninth feedback intervals) cause precoding feedback to be sent that specifies, for each transition, both the value of the new precoding index and the corresponding cluster that changed.

Notwithstanding the efficiency benefits of using temporal feedback compression, a significant amount of feedback overhead may be consumed when feeding back precoding information for a broadband MIMO channel. Accordingly, a selected embodiment of the present invention further reduces the feedback overhead by sending temporally compressed feedback for only a subset of the clusters that have changed. In effect, an upper bound is placed on the number of clusters for which precoding feedback is allowed. For example, rather than sending feedback for all the clusters that have changed, feedback is sent only for a number F (where $1 \leq F < N$) of clusters from the clusters that have changed. Again, the feedback will consist of the changed precoding indices and $\log_2(N)$ bits indicating which cluster has changed. To select which of the clusters having changed precoders will provide precoding feedback, the clusters can be ranked or sorted or otherwise chosen with any desired technique. For example, the candidate clusters may be ranked by their corresponding channel quality indicator, such as a CINR (Carrier-to-Interference plus Noise Ratio) or SINR (Signal-to-Interference plus Noise Ratio) value. Once the candidate clusters are ranked, F of the top-ranked candidate clusters are chosen for feedback. As will be appreciated, the fixed number F may be fixed across all feedback intervals, or may be variable for each feedback interval. When F is fixed, then the size of feedback is fixed, and when F is variable, the size of feedback is also variable. When F is fixed, and if less than F clusters, say C clusters, have changed precoder indices, then it is to be understood that zeros are sent in place of the F−C clusters or alternate information can sent in place of the F−C clusters.

By now it should be appreciated that there has been provided a method and system for precoding signals in a MIMO communication system by compressing the precoding feedback to reduce the average rate of precoder feedback. As described, the receiver estimates the channel state information for a transmission channel from a transmitting device by receiving one or more signals at the first receiving device. Using the channel state information, the receiver generates precoding information for the transmission channel by identifying a first precoding profile from a first codebook at the first receiving device that corresponds to the channel state information. For example, the precoding information may be a quantized precoding parameter, such as an index value from the first codebook that is associated with the first precoding profile that corresponds to the channel state information corresponding to the first precoding profile. In another example, a plurality of precoding profiles for a corresponding plurality of sub-carrier clusters (each having one or more sub-carrriers) in a broadband channel may be identified and quantized into precoding indices. The precoding information is then compressed to remove redundancy from the precoding information, thereby generating compressed precoding information.

A variety of compression techniques may be used. For example, the precoding information may be temporally compressed by sending precoding information for a predetermined time interval over a feedback channel to the transmitting device only if a difference is detected between the precoding information for the predetermined time interval and precoding information for a previous time interval. Where there are a plurality of precoding profiles for a plurality of sub-carrier clusters, the plurality of precoding profiles may be compressed to remove temporal redundancy from the plurality of precoding profiles, thereby generating temporally compressed precoding information for each sub-carrier cluster. The temporally compressed precoding information may be sent over a feedback channel for only a first predetermined number F of the sub-carrier clusters whose precoding information has changed, where the predetermined number is either fixed or variable across a plurality of feedback interval. If the actual number C of sub-carrier clusters whose precoding information has changed is less than the first predetermined number F, then alternate information may be sent along with the temporally compressed precoding information, such that the alternate information is sent in place of the F–C sub-carrier clusters. In addition or in the alternative, the precoding information may be compressed by run length encoding the precoding information to remove frequency domain redundancy from the precoding information. In selected embodiments, frequency compression is implemented by parsing the precoding information to identify a sequence formed from a value that is repeated a plurality of times in the sequence, and then encoding the sequence as a first coding value and a second coding value, where the first coding value specifies the value of the sequence and the second coding value specifies how many times the value is repeated in the sequence. However compressed, the compressed precoding information is fed back to the transmitting device where it is used to access a second codebook at the transmitting device to retrieve a second precoding profile that matches the first precoding profile and that is used to control transmission over the transmission channel from the transmitting device to the first receiving device. For example, if the precoding information was run length encoded at the receiver, the transmitter performs run length decoding on the compressed precoding information. In addition, the compressed precoding information may be generated at a transmitter having knowledge of the channel state information, and then fed forward to a receiving device where it is used to access a second codebook at the transmitting device to retrieve a second precoding profile that matches the first precoding profile and that is used to control processing of a signal transmitted over the transmission channel from the transmitting device to the first receiving device.

In another form, there is disclosed a method for precoding signals in a MIMO communication system. As described, channel state information is estimated for a transmission channel by receiving one or more signals. Precoding information for a plurality of sub-carriers is then generated for the transmission channel by identifying a plurality of precoding profiles corresponding to the plurality of sub-carriers, and the precoding information is then compressed to remove redundancy from the precoding information, and thereby generate compressed precoding information, by run length encoding the precoding information to remove frequency domain redundancy from the precoding information. As will be appreciated, a processor may be used to generate and compress the precoding information, though other hardware or software techniques may be used. In various embodiments, the precoding information is compressed by parsing the precoding information to identify a sequence formed from a value that is repeated a plurality of times in the sequence, and then encoding the sequence in the precoding information as a first coding value and a second coding value, where the first coding value specifies the value of the sequence and the second coding value specifies how many times the value is repeated in the sequence. The compressed precoding information may be fed back or forward to a communication device (e.g., a transmitting device) which performs run length decoding on the compressed precoding information.

In yet another form, there is provided a communication device and methodology for precoding signals in a MIMO communication system. The disclosed communication device may include precoder compression module which is implemented as a processor for generating a transmission profile that corresponds to estimated channel state information for a MIMO transmission channel, and for compressing the transmission profile to remove redundancy from the transmission profile by sending quantized transmission profile information for a predetermined time interval over a feedback or feed forward channel to a communication device only if a difference is detected between the quantized transmission profile information for the predetermined time interval and quantized transmission profile information for a previous time interval. While a single transmission profile may be generated and compressed for a given transmission channel, the precoder compression module may also be used to compress a plurality of transmission profiles for a corresponding plurality of sub-carrier clusters in a broadband channel. In the latter case, the precoder compression module may send over a feedback or feed forward channel quantized transmission profile information for up to a predetermined number F of the sub-carrier clusters whose transmission profile information has changed.

The methods and systems for designing and using compressed precoding feedback in a limited feedback MIMO system as shown and described herein may be implemented in hardware or in software stored on a computer-readable medium and executed as a computer program on a general purpose or special purpose computer to perform certain tasks. For a hardware implementation, the elements used to perform various signal processing steps at the transmitter (e.g., coding and modulating the data, decompressing the precoding feedback, precoding the modulated signals, preconditioning the precoded signals, and so on) and/or at the receiver (e.g., recovering the transmitted signals, demodulating and decoding the recovered signals, compressing and quantizing optimal precoding information for feedback, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various MIMO precoding systems and methods for using same, the present invention is not necessarily limited to the example embodiments illustrate herein. For example, various embodiments of a MIMO precoding system and design methodology disclosed herein may be implemented in connection with various proprietary or wireless communication standards, such as IEEE 802.16e, 3GPP-LTE, DVB and other multi-user MIMO systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for precoding signals in a MIMO communication system, comprising:
   estimating channel state information for a transmission channel from a transmitting device to a first receiving device by receiving one or more signals;
   generating precoding information for the transmission channel by identifying a first precoding profile for a cluster of sub-carriers from a first codebook that corresponds to the channel state information; and
   compressing the precoding information to remove redundancy in the frequency domain by run length encoding the precoding information for the cluster of sub-carriers, thereby generating compressed precoding information.

2. The method of claim 1, where the precoding information comprises quantized precoding parameters corresponding to the first precoding profile.

3. The method of claim 1, where the first codebook is located at the first receiving device, further comprising sending the compressed precoding information over a feedback channel to the transmitting device for use in accessing a second codebook at the transmitting device to retrieve a second precoding profile that matches the first precoding profile, where the second precoding profile is used to control transmission over the transmission channel from the transmitting device to the first receiving device.

4. The method of claim 1, where the first codebook is located at the transmitting device, further comprising sending the compressed precoding information over a feed forward channel to the first receiving device for use in accessing a second codebook at the first receiving device to retrieve a second precoding profile that matches the first precoding profile, where the second precoding profile is used to control processing of a signal transmitted over the transmission channel by the transmitting device to the first receiving device.

5. The method of claim 1, where generating precoding information comprises retrieving an index value from the first codebook that is associated with the first precoding profile that corresponds to the channel state information.

6. The method of claim 1, where generating precoding information for the transmission channel comprises identifying a plurality of precoding profiles for a corresponding plurality of sub-carrier clusters in a broadband channel.

7. The method of claim 1, further comprising sending compressed precoding information for only a first predetermined number F of the sub-carrier clusters whose precoding information has changed, where the predetermined number is fixed across a plurality of feedback intervals.

8. The method of claim 7, further comprising sending alternate information along with the temporally compressed precoding information when a number C of sub-carrier clusters whose precoding information has changed is less than the first predetermined number F, such that the alternate information is sent in place of the F—C sub-carrier clusters.

9. The method of claim 1, further comprising sending compressed precoding information for only a first predetermined number F of the sub-carrier clusters whose precoding information has changed, where the predetermined number varies across a plurality of feedback intervals.

10. The method of claim 6, where each sub-carrier cluster comprises one or more sub-carriers.

11. A method for precoding signals in a MIMO communication system, comprising:
   estimating channel state information for a transmission channel from a transmitting device to a first receiving device by receiving one or more signals;
   generating precoding information for the transmission channel by identifying a first precoding profile for a cluster of sub-carriers from a first codebook that corresponds to the channel state information; and
   compressing the precoding information to remove redundancy from the precoding information, thereby generating compressed precoding information, by run length encoding the precoding information for the cluster of sub-carriers to remove frequency domain redundancy from the precoding information.

12. The method of claim 11, where compressing the precoding information comprises:
   parsing the precoding information to identify a sequence formed from a value that is repeated a plurality of times in the sequence; and
   encoding the sequence in the precoding information as a first coding value and a second coding value, where the first coding value specifies the value of the sequence and the second coding value specifies how many times the value is repeated in the sequence.

13. The method of claim 11, further comprising feeding back the compressed precoding information to the transmitting device which performs run length decoding on the compressed precoding information, where the compressed precoding information was compressed at the first receiving device by performing run length encoding on the precoding information.

14. The method of claim 11, where a processor is used to generate and compress the precoding information.

15. The method of claim 11, where the precoding information comprises a plurality of precoder indices for a plurality of clusters of sub-carriers which are run length encoded to remove frequency domain redundancy.

16. A communication device for precoding signals in a MIMO communication system, comprising a precoder compression module for generating a transmission profile for a cluster of sub-carriers from a codebook that corresponds to estimated channel state information for a MIMO transmission channel and compressing the transmission profile to remove redundancy from the transmission profile by run length encoding precoding information for the cluster of sub-carriers to remove frequency domain redundancy from the precoding information.

17. The communication device of claim 16, where the precoder compression module comprises a processor for generating and compressing a transmission profile.

18. The communication device of claim 16, where the precoder compression module compresses a plurality of transmission profiles for a corresponding plurality of sub-carrier clusters in a broadband channel.

19. The communication device of claim 18, where the precoder compression module sends quantized transmission profile information for up to a predetermined number F of the sub-carrier clusters whose transmission profile information has changed.

* * * * *